US010923290B2

(12) United States Patent
Kubo et al.

(10) Patent No.: US 10,923,290 B2
(45) Date of Patent: Feb. 16, 2021

(54) ELECTROLYTIC CAPACITOR-SPECIFIC ELECTRODE MEMBER AND ELECTROLYTIC CAPACITOR

(71) Applicants: JAPAN CAPACITOR INDUSTRIAL CO., LTD., Fussa (JP); MURATA MANUFACTURING CO., LTD., Nagaokakyo (JP)

(72) Inventors: Hiroshi Kubo, Fussa (JP); Nami Kanaya, Fussa (JP); Kazumasa Fujimoto, Nagaokakyo (JP); Tomoki Nobuta, Nagaokakyo (JP)

(73) Assignees: JAPAN CAPACITOR INDUSTRIAL CO., LTD., Fussa (JP); MURATA MANUFACTURING CO., LTD., Nagaokakyo (JP)

( * ) Notice: Subject to any disclaimer, the term of this patent is extended or adjusted under 35 U.S.C. 154(b) by 49 days.

(21) Appl. No.: 16/333,420

(22) PCT Filed: Sep. 16, 2016

(86) PCT No.: PCT/JP2016/077595
§ 371 (c)(1),
(2) Date: Mar. 14, 2019

(87) PCT Pub. No.: WO2018/051521
PCT Pub. Date: Mar. 22, 2018

(65) Prior Publication Data
US 2019/0252126 A1  Aug. 15, 2019

(51) Int. Cl.
*H01G 9/048* (2006.01)
*H01G 9/028* (2006.01)

(52) U.S. Cl.
CPC ............ *H01G 9/048* (2013.01); *H01G 9/028* (2013.01)

(58) Field of Classification Search
CPC ............................. H01G 9/025; H01G 9/048
See application file for complete search history.

(56) References Cited

U.S. PATENT DOCUMENTS

| 2006/0164189 A1 | 7/2006 | Tohya et al. |
| 2007/0030622 A1 | 2/2007 | Saida et al. |

(Continued)

FOREIGN PATENT DOCUMENTS

| CN | 1689189 A | 10/2005 |
| CN | 101167148 A | 4/2008 |

(Continued)

OTHER PUBLICATIONS

Jul. 24, 2019 Supplementary European Search Report issued in European Patent Application No. 16916301.1

(Continued)

*Primary Examiner* — Eric W Thomas
(74) *Attorney, Agent, or Firm* — Oliff PLC

(57) ABSTRACT

An electrolytic capacitor-specific electrode member is included in an electrolytic capacitor. The electrolytic capacitor-specific electrode member has a wire shape. The electrolytic capacitor-specific electrode member includes a core portion and a porous layer located around the core portion. In a cross section of the electrolytic capacitor-specific electrode member perpendicular to its axial direction, the porous layer includes a plurality of layers arranged concentrically from the core portion toward outside and at least including two layers having different void ratios.

6 Claims, 12 Drawing Sheets

(56) References Cited

U.S. PATENT DOCUMENTS

| | | | |
|---|---|---|---|
| 2008/0123252 A1* | 5/2008 | Kasuga | H01G 9/025 361/525 |
| 2009/0128996 A1 | 5/2009 | Kobayashi et al. | |
| 2009/0303661 A1 | 12/2009 | Katano et al. | |
| 2010/0039751 A1 | 2/2010 | Oohata et al. | |
| 2011/0222209 A1 | 9/2011 | Ohyama | |
| 2017/0076872 A1 | 3/2017 | Arakawa et al. | |

FOREIGN PATENT DOCUMENTS

| | | |
|---|---|---|
| CN | 101203926 A | 6/2008 |
| JP | S61-278124 A | 12/1986 |
| JP | H02-288217 A | 11/1990 |
| JP | H03-104207 A | 5/1991 |
| JP | H11-016787 A | 1/1999 |
| JP | H11-307400 A | 11/1999 |
| JP | 2001-143972 A | 5/2001 |
| JP | 2008-078330 A | 4/2008 |
| JP | 2008-177199 A | 7/2008 |
| JP | 2008-177200 A | 7/2008 |
| WO | 2004/023597 A1 | 3/2004 |
| WO | 2007/058242 A1 | 5/2007 |
| WO | 2010/058534 A1 | 5/2010 |
| WO | 2015/190278 A1 | 12/2015 |

OTHER PUBLICATIONS

Nov. 29, 2016 International Search Report issued in International Patent Application No. PCT/JP2016/077595.
Jun. 1, 2020 Office Action issued in Chinese Patent Application No. 201680089342.2.

* cited by examiner

ELECTROLYTIC CAPACITOR-SPECIFIC ELECTRODE MEMBER AND ELECTROLYTIC CAPACITOR

TECHNICAL FIELD

The present invention relates to an electrolytic capacitor-specific electrode member (an electrode member for electrolytic capacitor) and an electrolytic capacitor.

BACKGROUND ART

A capacitor has a capacitance proportional to the surface area of a dielectric formed on an electrode member. Thus, as one method for increasing the capacitance of an electrolytic capacitor, the surface area of an electrode member used therefor is conventionally increased. As specific methods, for example, the surface of an electrode member is roughened, and a sintered body is used for an electrode member.

FIG. 11 is a diagram schematically showing a conventional electrolytic capacitor. FIG. 11 does not show a separator. As shown in FIG. 11, an electrolytic capacitor includes: an anode body 1; a dielectric 2 formed on anode body 1; an electrolyte 3 disposed adjacent to dielectric 2 on the opposite side to anode body 1; a cathode body 5 disposed to face anode body 1 with electrolyte 3 interposed therebetween; and a dielectric 4 formed on cathode body 5 so as to be adjacent to electrolyte 3.

The capacitance of the electrolytic capacitor is equal to a combined capacitance obtained from a series connection of: a capacitor formed of anode body 1, dielectric 2 and electrolyte 3; and a capacitor formed of electrolyte 3, dielectric (natural oxide film) 4 and cathode body 5. Generally, cathode body 5 to be employed has a sufficiently high capacitance as compared with anode body 1. Thus, the capacitance of the electrolytic capacitor is significantly influenced by the value of the capacitance of the capacitor formed of anode body 1, dielectric 2 and electrolyte 3.

Even if the surface of anode body 1 is formed to have complicated projections and depressions as much as possible, but when there is a portion where dielectric 2 and electrolyte 3 formed on anode body 1 are not in contact with each other, that is, when electrolyte impregnation is not sufficiently achieved, the capacitance of the electrolytic capacitor is decreased accordingly.

This impregnation performance of the electrolyte is important particularly to, among electrolytic capacitors, a solid electrolytic capacitor formed using a solid electrolyte such as a conductive polymer as an electrolyte.

FIG. 12 is a diagram schematically showing the degree of impregnation with a solid electrolyte in a conventional electrolytic capacitor-specific electrode member. FIG. 12 mainly shows the state of contact between dielectric 2 and electrolyte 3 shown in FIG. 11. As shown in FIG. 12, even if a large number of microscopic projections and depressions are formed on the surface of anode body 1 to increase the surface area of anode body 1 as much as possible, but when the sizes of the projections and depressions are not sufficiently large as compared with the diameter of each conductive polymer, there occurs a large area where solid electrolyte 6 as an electrolyte is not in contact with dielectric 2. In other words, the capacitance appearance ratio showing the proportion of the capacitance obtained by impregnation with a solid electrolyte to the capacitance obtained by impregnation with an electrolyte is decreased.

Thus, the following proposals have been made until now for the electrolytic capacitor-specific electrode member formed in a foil shape or a plate shape.

In Japanese Patent Laying-Open No. 2008-078330 (PTD 1), a too small etching pit diameter prevents sufficient impregnation with a solid electrolyte, and mixing of a large etching pit diameter leads to nonuniform impregnation, which causes a problem that an ESR is increased when an electrolytic capacitor is fabricated. In contrast, PTD 1 proposes an aluminum electrode plate for electrolytic capacitor as follows. Specifically, at least one side surface of the aluminum electrode plate for electrolytic capacitor has an etching layer of 70 μm or more from its surface in the depth direction. By an image analysis apparatus, the plane cross section of the etching layer at the position 20 μm deep from the surface is measured. According to the measurement results, on each of the measured planes of the etching layer, the number of pits each having a pit diameter of 0.01 μmϕ, to 1 μmϕ, converted into a circle is 70% or more of the total number of pits in the measured plane.

Japanese Patent Laying-Open No. 02-288217 (PTD 2) discloses a solid electrolytic capacitor formed using, as a solid electrolyte, a conductive polymer film including: a conductive polymer film formed by chemical oxidation polymerization; and a conductive polymer film formed thereon by electrolytic polymerization. In this case, there is a problem that the obtained capacitance varies depending on the roughened electrode foil to be used. In order to address the above-described problem, PTD 2 focuses attention on the relation between formation of a conductive polymer film and roughening of valve action metal, to find the maximum pit depth at which a conductive polymer film can be formed by chemical oxidation polymerization, to thereby propose a roughened electrode foil in which the pit depth of the valve action metal having a dielectric oxide film formed thereon is 16 μm or more on average.

In Japanese Patent Laying-Open No. 2001-143972 (PTD 3), there is a problem that the increasing demands to increase the capacitance cannot be fulfilled only by providing protrusions and cavities on the foil surface. In order to address the above-described problem, PTD 3 proposes an aluminum foil for electrolytic capacitor electrode. Specifically, the aluminum foil for electrolytic capacitor electrode is provided as an aluminum foil having a surface provided with a large number of primary cavities each having an opening diameter (d1) as a circle equivalent diameter of 0.1 μm to 5 μm. These primary cavities include: (i) primary cavities satisfying the condition that the maximum inner diameter (d2) is larger than the opening diameter (d1) so as to have an largely expanded inner portion, in which the opening diameter (d1)/the maximum inner diameter (d2) is less than 0.9; and (ii) primary cavities satisfying the condition that each primary cavity is provided with one or more secondary cavities opened to the inside thereof, in which an opening diameter (d3) of at least one of these secondary cavities is ½ or less of the opening diameter (d1) of the primary cavity. There are 20% or more of (i) primary cavities and (ii) primary cavities in total in the aluminum foil.

Japanese Patent Laying-Open No. 03-104207 (PTD 4) discloses the following problem. Specifically, the conventional combined etching of direct-current (DC) etching and alternating-current (AC) etching does not allow a sufficiently large average opening diameter of a tunnel-shaped pit produced by DC etching in the preceding stage. Thus, even when AC etching is performed in the subsequent stage, etching on the inner wall surface of the tunnel-shaped pit hardly progresses, but only the electrode surface portion is uniformly dissolved, so that a desired area increasing effect cannot be achieved. In order to address the above-described problem, PTD 4 proposes a method of etching an electrolytic capacitor-specific electrode, by which a pit having an opening diameter less than 1 μm is formed by the first DC etching, and then, the opening diameter is enlarged to 1 μm to 4 μm by the second DC etching, which is then subjected to AC etching.

Japanese Patent Laying-Open No. 11-307400 (PTD 5) discloses a method of manufacturing a solid electrolytic capacitor-specific electrode foil, in which the step of providing a separation, by masking, between an etching portion to be etched and a non-etching portion not to be etched is first performed. In this case, as a method of etching the etching portion, the etching portion is subjected to DC etching and then immersed in an electrolytic solution for AC etching to gradually increase the current density of AC etching, which is followed by AC etching at a constant current.

For the purpose of enlarging the surface area of the aluminum electrode foil per unit weight loss by etching, Japanese Patent Laying-Open No. 11-016787 (PTD 6) proposes a manufacturing method of performing initial etching such as AC etching, then forming a barrier-type anodic oxide film, and then further performing AC etching, which is followed by a repetition of formation of a barrier-type oxide film and AC etching.

As described above, the conventional technique has been summarized in view of capacitance while focusing attention on the capacitance appearance ratio, but the characteristics required for the electrolytic capacitor are not only capacitance. For example, a practical capacitor includes a defective dielectric that does not serve as a complete insulator. Accordingly, when a DC voltage is applied to the capacitor, any minimal leakage current occurs, which may have an adverse effect upon a circuit. This causes a strong demand to reduce such a leakage current, with the result that the following proposals have been made until now.

Japanese Patent Laying-Open No. 2008-177199 (PTD 7) and Japanese Patent Laying-Open No. 2008-177200 (PTD 8) each disclose that a foil-shaped electrode member is used. In this case, even if the electrode is reduced in width for size reduction, the proportion of the area of the end face to the apparent area of the electrode is increased accordingly. This causes a problem that the adverse effect of the dielectric on the end face formed by aging becomes significant, that is, the leakage current in a solid electrolytic capacitor is increased in accordance with size reduction. In order to address the above-described problem, PTD 7 and PTD 8 each propose that an aluminum wire etched as an anode body and having a surface with a dielectric formed thereon is wound in a spiral shape.

Japanese Patent Laying-Open No. 61-278124 (PTD 9) discloses the following problem. Specifically, a sintered-type capacitor including an anode made of aluminum is cheaper in material than that including an anode made of tantalum. However, this sintered-type capacitor is not only difficult to be reduced in size and increased in capacity but also is not advantageous in terms of cost as compared with a foil-shaped and winding-type aluminum electrolytic capacitor. In order to address the above-described problem, PTD 9 proposes a method of manufacturing an anode body by continuously supplying a linear-shaped valve action metal and roughening the surface of the metal to thereby form an oxide film.

CITATION LIST

Patent Literature

PTL 1: Japanese Patent Laying-Open No. 2008-078330
PTL 2: Japanese Patent Laying-Open No. 02-288217
PTL 3: Japanese Patent Laying-Open No. 2001-143972
PTL 4: Japanese Patent Laying-Open No. 03-104207
PTL 5: Japanese Patent Laying-Open No. 11-307400
PTL 6: Japanese Patent Laying-Open No. 11-016787
PTL 7: Japanese Patent Laying-Open No. 2008-177199
PTL 8: Japanese Patent Laying-Open No. 2008-177200
PTL 9: Japanese Patent Laying-Open No. 61-278124

SUMMARY OF INVENTION

Technical Problem

PTD 1 aims to improve the impregnation performance at the position 20 μm deep from the surface. Specifically, a prescribed number of microscopic pits significantly contributing to the capacitance are formed at the position 20 μm deep from the surface.

However, PTD 1 fails to mention the impregnation performance to at the position of 20 μm deep from the surface. PTD 1 discloses that pits are coupled to each other near the surface to thereby form a pit having a uselessly large diameter, but fails to mention the specific size of the uselessly large pit diameter. Thus, it is unclear whether or not the impregnation performance is ensured from the surface to the depth at which microscopic pits significantly contributing to the capacitance are formed.

PTD 2 is based on the findings found by the inventors of PTD 2 conducting experiments, and specifically, based on the findings that a conductive polymer film can be formed by chemical oxidation polymerization from the surface to a depth of an average of 16 μm. In this PTD 2, the figures show only a tunnel-shaped pit since the capacitance appearance ratio is less relevant to the pit shape. However, as described above, since the pit shape also contributes to the capacitance of the electrolytic capacitor, the pit shape needs to be taken into consideration in order to achieve a high capacitance appearance ratio.

PTD 3 discloses a roughened layer obtained by a combination of cavities having different opening diameters in order to enlarge the surface area of an electrode member. Particularly referring to the figures, the cross-sectional shape of each cavity has an approximately circular shape.

Furthermore, each of PTD 4 and PTD 5 discloses that a pit is formed by AC etching inside a tunnel-shaped pit formed by DC etching in order to enlarge the surface area of an electrode member. In particular, PTD 4 discloses a suitable range of the opening diameter of a tunnel-shaped pit.

Furthermore, PTD 6 also discloses a method of deeply growing a uniform etching pit layer in the depth direction of the foil, for the purpose of enlarging the surface area of the electrode member, in the state where entire surface dissolution from the foil surface does not occur also after electrolytic etching and the state where the formed etching pits are not increased in size due to dissolution by an electrolytic solution.

However, the impregnation performance of the solid electrolyte is not taken into consideration for the structures of the roughened layer and the etching layer disclosed in each of PTD 3 to PTD 6.

PTD 1 to PTD 6 each relate to a foil-shaped or plate-shaped electrode member, and therefore, cannot provide a suitable electrode member based on the consideration of aspects such as a leakage current in a solid electrolytic capacitor, which may become a problem particularly in size reduction.

PTD 7 and PTD 8 each disclose that a linear-shaped valve action metal is etched as an electrode member.

PTD 7 and PTD 8 each fail to mention the capacitance appearance ratio. Also, PTD 7 and PTD 8 each fail to mention the specific processing method for etching performed for an aluminum wire and the specific structure of an etching layer.

PTD 9 illustrates four types of shapes including a circular shape, a semicircular shape, a track shape, and a quadrangular shape as examples of the cross-sectional shape of a linear-shaped valve action metal to be etched as an electrode member.

However, PTD 7 to PTD 9 each fail to disclose a specific structure of the etching layer, and therefore, fail to provide a suitable electrode member based on the consideration of aspects such as the capacitance appearance ratio and the capacitance. Also, in PTD 9, the influence caused by the difference of the cross-sectional shape of the linear-shaped valve action metal is not taken into consideration.

The present invention has been made in light of the above-described problems. An object of the present invention is to provide: an electrolytic capacitor-specific electrode member allowing sufficient impregnation with an electrolyte to achieve a high capacitance appearance ratio when manufacturing an electrolytic capacitor; and an electrolytic capacitor including the electrolytic capacitor-specific electrode member.

Solution to Problem

The electrolytic capacitor-specific electrode member according to the present invention is included in an electrolytic capacitor. The electrolytic capacitor-specific electrode member has a wire shape. The electrolytic capacitor-specific electrode member includes a core portion and a porous layer that is located around the core portion. In a cross section of the electrolytic capacitor-specific electrode member perpendicular to an axial direction of the electrolytic capacitor-specific electrode member, the porous layer includes a plurality of layers that are concentrically arranged from the core portion toward outside and that at least include two layers having different void ratios.

The wire shape includes a linear shape, a rod shape, a wire shape, a fiber shape, a string shape, a belt shape, or an elongated pellet shape. It is preferable that the wire shape is formed to have a minor axis and a major axis in a view seen from the direction perpendicular to the axial direction of the electrolytic capacitor-specific electrode member, but may be formed in a shape such that the length in the longitudinal direction parallel to the axial direction is equal to the width in the width direction orthogonal to the longitudinal direction.

The electrolytic capacitor-specific electrode member according to the present invention, preferably, when a void ratio per unit area in an n-th layer from an outermost layer among the plurality of layers is expressed by f(n) (n being a positive integer), $f(2k-1)<f(2k)$ and $f(2k)>f(2k+1)$ or $f(2k-1)>f(2k)$ and $f(2k)<f(2k+1)$ are satisfied (k being a positive integer).

In the electrolytic capacitor-specific electrode member according to the present invention, preferably, each of the plurality of layers has a thickness that is approximately uniform in a circumferential direction.

In the electrolytic capacitor-specific electrode member according to the present invention, preferably, in a macroscopic view of a cross-sectional shape of the electrolytic capacitor-specific electrode member perpendicular to the axial direction, the cross-sectional shape has a peripheral edge formed in an annular shape not having an angular portion.

A macroscopic view shows reduction ratios at which the opening plane in the cavity portion in the circumferential direction of the cross-sectional shape appears to be closed due to the state where one end and the other end of this opening plane appear to be connected to each other in the circumferential direction as a result of reducing the size of the cross-sectional shape of the electrolytic capacitor-specific electrode member that is perpendicular to the axial direction, and preferably shows the maximum reduction ratio among these reduction ratios.

An electrolytic capacitor according to the present invention includes: the electrolytic capacitor-specific electrode member; a counter electrode member disposed to face the electrolytic capacitor-specific electrode member; and an electrolyte disposed between the electrolytic capacitor-specific electrode member and the counter electrode member.

In the electrolytic capacitor according to the present invention, preferably, the electrolyte is a solid electrolyte containing a conductive polymer.

Advantageous Effects of Invention

It becomes possible to provide: an electrolytic capacitor-specific electrode member allowing sufficient impregnation with an electrolyte to achieve a high capacitance appearance ratio when manufacturing an electrolytic capacitor; and a solid electrolytic capacitor including the electrolytic capacitor-specific electrode member.

DESCRIPTION OF EMBODIMENTS

Figure 1:
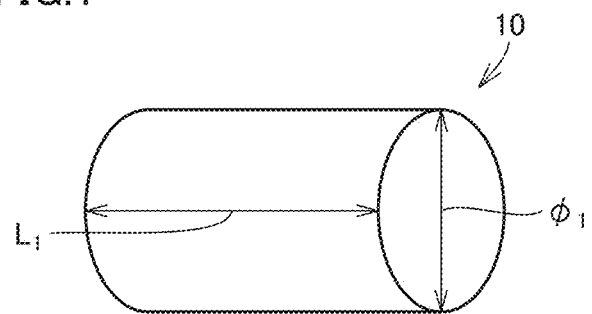
FIG. 1 is a perspective view schematically showing the first example of a base material as a precursor of an electrolytic capacitor-specific electrode member in the present invention.

The following description about embodiments for implementing the present invention is merely made for one embodiment of the present invention, and the present invention is not limited to these embodiments but can be appropriately modified and implemented so as not to deviate from the range of the gist.

In the embodiments described below, the same or corresponding components are designated by the same reference characters, and description thereof will not be repeated.

1. Base Material

A base material 10 as described below is a precursor of an electrolytic capacitor-specific electrode member 20 (see FIG. 6 and the like) as will be described later.

Base material 10 is etched to form a porous layer 85 (described later) on the outer surface side of base material 10, so that electrolytic capacitor-specific electrode member 20 can be manufactured. In this case, base material 10 includes both a core portion 7 and a porous layer 85 (described later) included in electrolytic capacitor-specific electrode member 20.

Furthermore, also by forming porous layer 85 around base material 10 by vapor deposition, powder adhesion and the like, electrolytic capacitor-specific electrode member 20 can be manufactured. In this case, base material 10 forms core portion 7.

Figure 2:
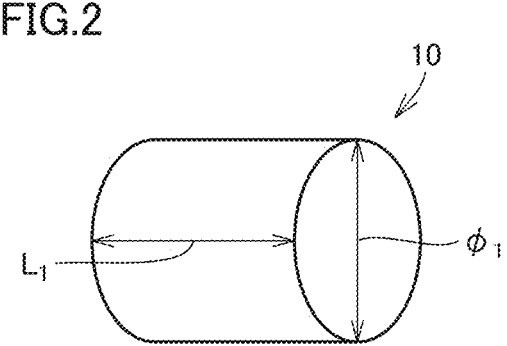
FIG. 2 is a perspective view schematically showing the second example of the base material as a precursor of the electrolytic capacitor-specific electrode member in the present invention.
Figure 3:
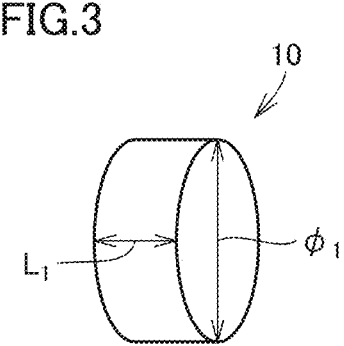
FIG. 3 is a perspective view schematically showing the third example of the base material as a precursor of the electrolytic capacitor-specific electrode member in the present invention.

FIG. 1 is a perspective view showing the first example of a base material as a precursor of an electrolytic capacitor-specific electrode member in the present invention. FIG. 2 is a perspective view schematically showing the second example of the base material as a precursor of the electrolytic capacitor-specific electrode member in the present invention. FIG. 3 is a perspective view schematically showing the third example of the base material as a precursor of the electrolytic capacitor-specific electrode member in the present invention. Referring to FIGS. 1 to 3, the shape of the base material as a precursor of the electrolytic capacitor-specific electrode member in the present invention will be described below.

Base material 10 may be formed in various shapes such as a linear shape, a rod shape, a wire shape, a fiber shape, a string shape, a belt shape, and an elongated pellet shape. Base material 10 extends in a prescribed direction and has an axial direction.

The relation between the length of base material 10 in its longitudinal direction (the axial direction) and the thickness of base material 10 in the thickness direction orthogonal to this longitudinal direction is not particularly limited.

As shown in FIGS. 1 to 3, base material 10 has an approximately cylindrical shape, for example. Also, the cross-sectional shape of base material 10 perpendicular to its axial direction has an approximately circular shape. As shown in FIG. 1, the relation between a diameter $\phi_1$ showing the thickness of base material 10 and a length $L_1$ may be $\phi_1 < L_1$. In this case, base material 10 has an elongated shape. Further, as shown in FIG. 2, the relation between diameter $\phi_1$ showing the thickness of base material 10 and length $L_1$ may be $\phi_1 = L_1$. Further, as shown in FIG. 3, the relation between diameter $\phi_1$ showing the thickness of base material 10 and length $L_1$ may be $\phi_1 > L_1$. In this case, base material 10 has a shape like a flat coin. It is preferable that base material 10 satisfies the relation of $\phi_1 < L_1$. In this case, also in electrolytic capacitor-specific electrode member 20, the relation between a diameter $\phi_2$ showing the thickness of the electrolytic capacitor-specific electrode member and a length $L_2$ of the electrolytic capacitor-specific electrode readily satisfies the relation of $\phi_2 < L_2$. Thus, when the electrolytic capacitor is manufactured, the proportion of the surface area to the cross-sectional area is increased, so that a capacitance can be readily achieved. Furthermore, a leakage current can also be further reduced.

The cross-sectional shape of base material 10 perpendicular to its axial direction is not limited to a circular shape. The cross-sectional shape of base material 10 may be an oval shape such as an elliptical shape, an oblong circular shape, a track shape, and an egg shape, or may be a peanut shape.

Furthermore, it is preferable that the peripheral edge of the cross-sectional shape of base material 10 that is perpendicular to its axial direction has an annular shape not having an angular portion. This annular shape includes a polygonal shape having roundish corner portions, the above-mentioned oval shape, the above-mentioned peanut shape, and the like.

As the peripheral edge of the cross-sectional shape of base material 10 that is perpendicular to the axial direction has the above-described shape, a solid electrolyte is formed so as to extend along the surface of electrolytic capacitor-specific electrode member 20 when an electrolytic capacitor is manufactured, as described later. Thereby, the adhesiveness between electrolytic capacitor-specific electrode member 20 and the solid electrolyte is ensured, so that a high capacitance appearance ratio can be achieved.

Figure 4:
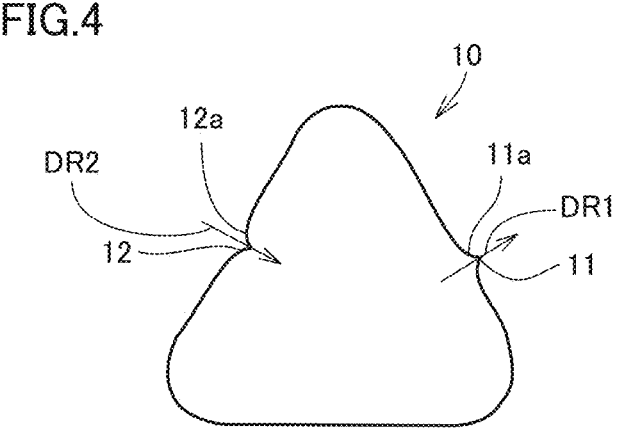
FIG. 4 is a diagram showing an example of a cross-sectional shape obtained when the base material as a precursor of the electrolytic capacitor-specific electrode member in the present invention is cut perpendicular to its longitudinal direction.

FIG. 4 is a diagram showing an example of a cross-sectional shape obtained when the base material as a precursor of the electrolytic capacitor-specific electrode member in the present invention is cut perpendicular to its longitudinal direction. Referring to FIG. 4, an example of the cross-sectional shape of base material 10 will be hereinafter described.

As shown in FIG. 4, the cross-sectional shape of base material 10 that is perpendicular to the axial direction has an approximately triangular shape having roundish corner portions, for example. Furthermore, base material 10 has a protrusion 11 that protrudes outward and a recess 12 that is recessed inward.

On its base portion, protrusion 11 has a curved portion 11a that curves so as to extend along a protruding direction DR1 toward the leading end. Curved portion 11a has a curved shape that curves so as to be recessed inside.

On its opening edge side, recess 12 has a curved portion 12a that curves so as to extend along a recess direction DR2 toward the bottom. Curved portion 12a has a curved shape that curves so as to protrude to the outside.

As described above, despite the existence of protrusion 11 and recess 12, such protrusion 11 and recess 12 have curved portion 11a and curved portion 12a, respectively, as described above, so that the adhesiveness of the solid electrolyte with the protrusion and the recess in electrolytic capacitor-specific electrode member 20 can be ensured when an electrolytic capacitor is manufactured. Thereby, also when base material 10 has protrusion 11 and recess 12, a high capacitance appearance ratio can be achieved.

The cross-sectional shape of base material 10 taken along the direction perpendicular to its longitudinal direction does not necessarily have to be uniform in the longitudinal direction.

Figure 5:
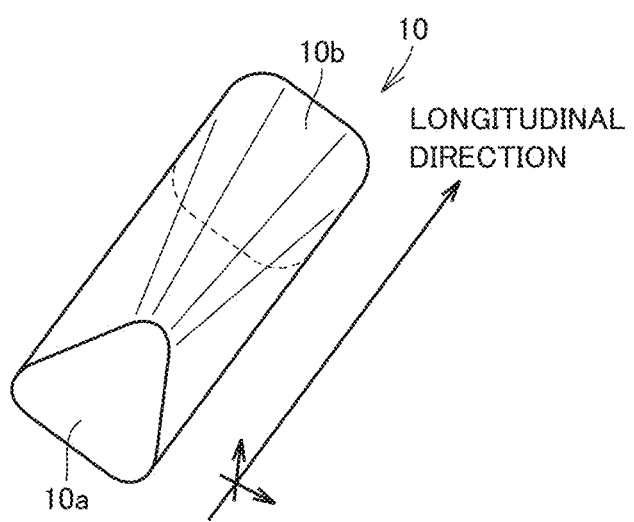
FIG. 5 is a diagram schematically showing the fourth example of the base material as a precursor of the electrolytic capacitor-specific electrode member in the present invention.

FIG. 5 is a diagram schematically showing the fourth example of the base material as a precursor of the electrolytic capacitor-specific electrode member in the present invention. Referring to FIG. 5, another shape of base material 10 will be hereinafter described.

As shown in FIG. 5, base material 10 has: an end portion 10a located on one side in the longitudinal direction and formed in an approximately triangular shape having roundish corner portions; and an end portion 10b located on the other side in the longitudinal direction and formed in an approximately quadrangular shape having roundish corner portions.

In this way, in base material 10, the shape of end portion 10a on one side in the longitudinal direction may be different from the shape of end portion 10b on the other side in the longitudinal direction. Also in this case, it is preferable that the above-described cross-sectional shape at an arbitrary position along the longitudinal direction has an annular shape not having an angular portion.

Furthermore, end portion 10a on one side in the longitudinal direction and end portion 10b on the other side in the longitudinal direction are not necessarily limited to a planar shape, but may be formed in a curved surface shape or formed by a point. For example, base material 10 may entirely have an ellipsoidal shape like a rugby ball formed to have a quadric surface.

Furthermore, as described later, when base material 10 is etched to manufacture electrolytic capacitor-specific electrode member 20, it is preferable that the shape of base material 10 is approximately the same as the shape of electrolytic capacitor-specific electrode member 20 for the purpose of simplifying the process of manufacturing an electrolytic capacitor. The shapes of base material 10 and electrolytic capacitor-specific electrode member 20 in this case mean the shapes as seen in a macroscopic view. Specifically, the shape of electrolytic capacitor-specific electrode member 20 corresponds to the shape in a view observed in a scale at which the cavity portions provided on its outer surface are not visible.

The purity and the impurities of base material 10 that are identical to those of the base material used for the conventional electrolytic capacitor-specific electrode member may be employed also in the present invention.

When electrolytic capacitor-specific electrode member 20 is manufactured using base material 10, a porous layer 85 (described later) is first formed, on which a dielectric 2 is then formed. In this case, it is preferable that dielectric 2 is made of an oxide containing a metal component derived from base material 10 in terms of adhesiveness between base material 10 and dielectric 2, or the like. Thus, the present invention preferably employs the base material made of a valve action metal such as aluminum, niobium and tantalum.

As described later, in the case where the porous layer is formed by etching, and when a crater-shaped cavity portion is formed at least in the first layer from the outermost layer among a plurality of layers forming a porous layer, Ni is added to the aluminum material to thereby facilitate dissolution of aluminum, so that a crater-shaped cavity portion can be readily formed. The Ni content of 5 ppm to 150 ppm, specifically 20 ppm to 100 ppm, is particularly suitable.

2. Electrolytic Capacitor-Specific Electrode Member (1) Shape of Electrolytic Capacitor-Specific Electrode Member FIG. 6 shows an enlarged view schematically showing a cross-sectional shape in the vicinity of a surface layer obtained when an electrolytic capacitor-specific electrode member according to one embodiment of the present invention is cut perpendicular to its longitudinal direction (the axial direction).

Figure 6:
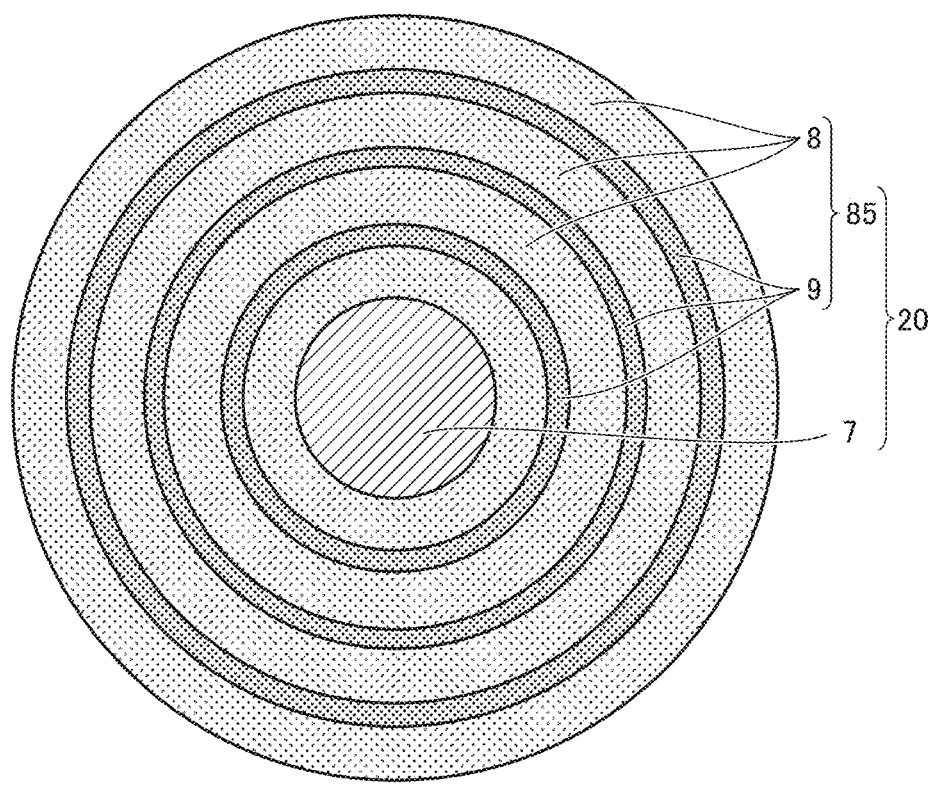
FIG. 6 is a schematic cross-sectional view of an electrolytic capacitor-specific electrode member according to one embodiment of the present invention that is cut perpendicular to its longitudinal direction (the axial direction).

As shown in FIG. 6, electrolytic capacitor-specific electrode member 20 includes a core portion 7 and a porous layer 85 that is located around core portion 7. When base material 10 is etched to manufacture electrolytic capacitor-specific electrode member 20, porous layer 85 is formed of a roughened surface of base material 10.

As described above, when electrolytic capacitor-specific electrode member 20 is manufactured by etching base material 10, electrolytic capacitor-specific electrode member 20 is approximately identical in shape to base material 10 in a macroscopic view. In this case, a macroscopic view shows the shape observed in a scale at which the cavity portions provided in the outer surface of electrolytic capacitor-specific electrode member 20 are not visible.

Specifically, electrolytic capacitor-specific electrode member 20 is formed in various shapes such as a linear shape, a rod shape, a wire shape, a fiber shape, a string shape, a belt shape, or an elongated pellet shape, as with base material 10. Furthermore, as described later, electrolytic capacitor-specific electrode member 20 may also be obtained by cutting base material 10 along the direction perpendicular to the axial direction, and also may have a shape obtained by cutting each of the above-described various shapes. The above-described various shapes and the shapes obtained by cutting the above-described various shapes will be hereinafter collectively referred to as a wire shape. Electrolytic capacitor-specific electrode member 20 has such a wire shape.

In a view seen from the direction orthogonal to the axial direction of base material 10, the wire shape preferably has a minor axis and a major axis, but may also be formed in a shape such that the length in the longitudinal direction parallel to the axial direction is equal to the width in the width direction orthogonal to the longitudinal direction.

The relation between the length of electrolytic capacitor-specific electrode member 20 in the longitudinal direction (the axial direction) and the thickness of electrolytic capacitor-specific electrode member 20 in the thickness direction orthogonal to the longitudinal direction is not particularly limited.

In a macroscopic view, electrolytic capacitor-specific electrode member 20 may have an approximately cylindrical shape, for example. In this case, the cross-sectional shape of electrolytic capacitor-specific electrode member 20 that is perpendicular to the axial direction is a circular shape. In this case, the relation between a diameter $\phi_2$ showing the thickness of electrolytic capacitor-specific electrode member 20 and a length $L_2$ may be $\phi_2 < L_2$, may be $\phi_2 = L_2$, or may be $\phi_2 > L_2$, as in the case of base material 10.

The cross-sectional shape of electrolytic capacitor-specific electrode member 20 perpendicular to the axial direction is not limited to a circular shape. The cross-sectional shape of electrolytic capacitor-specific electrode member 20 may have an oval shape such as an elliptical shape, an oblong circular shape, a track shape, and an egg shape, or may be a peanut shape.

It is preferable that the peripheral edge of the cross-sectional shape of electrolytic capacitor-specific electrode member 20 perpendicular to the axial direction has an annular shape not having an angular portion in a macroscopic view. This annular shape includes a polygonal shape having roundish corner portions, the above-mentioned oval shape, the above-mentioned peanut shape, and the like.

Assuming that an electrolytic capacitor is manufactured using electrolytic capacitor-specific electrode member 20 configured such that its cross-sectional shape perpendicular to the axial direction has an angled (for example, right-angled) and non-roundish corner, when a solid electrolyte such as a conductive polymer is used as an electrolyte, there is only a small area in which the solid electrolyte can come into contact with such an angled (for example, right-angled) and non-roundish corner of electrolytic capacitor-specific electrode member 20.

Accordingly, the adhesiveness between the solid electrolyte and electrolytic capacitor-specific electrode member 20 is poor at the above-mentioned angled (for example, right-angled) and non-roundish corner of electrolytic capacitor-specific electrode member 20. Thus, the solid electrolyte may peel off from electrolytic capacitor-specific electrode member 20. In addition, the solid electrolyte cannot be polymerized at the angled (for example, right-angled) and non-roundish corner of electrolytic capacitor-specific electrode member 20. Thereby, the capacitance appearance ratio may be decreased.

As in the present embodiment, by configuring electrolytic capacitor-specific electrode member 20 such that the peripheral edge of the cross-sectional shape of electrolytic capacitor-specific electrode member 20 that is perpendicular to the axial direction has an annular shape not having an angular portion in a macroscopic view, a solid electrolyte is formed so as to extend along the surface of electrolytic capacitor-specific electrode member 20. Consequently, the adhesiveness between electrolytic capacitor-specific electrode member 20 and the solid electrolyte is ensured, so that a high capacitance appearance ratio can be achieved.

When base material 10 has protrusion 11 and/or recess 12 as described above, electrolytic capacitor-specific electrode member 20 is also to have a protrusion and/or a recess. When electrolytic capacitor-specific electrode member 20 has a protrusion, as in base material 10, the protrusion has a curved portion on its base portion so as to curve along the protruding direction toward the leading end, so that the adhesiveness between the protrusion and the solid electrolyte can be ensured. Furthermore, when electrolytic capacitor-specific electrode member 20 has a recess, as in base material 10, the recess has a curved portion so as to curve along the recess direction toward the bottom, so that the adhesiveness between the recess and the solid electrolyte can be ensured. Thereby, also when electrolytic capacitor-specific electrode member 20 has a protrusion and/or a recess, a high capacitance appearance ratio can be achieved.

Furthermore, the shape of the electrolytic capacitor-specific electrode member in the present invention may also be different from the shape of the base material. For example, even when the base material has an elongated shape such that $\phi_1 < L_1$ as shown in FIG. 1, the base material is cut when manufacturing an electrolytic capacitor, to be formed in a flat coin shape such that the relation between diameter $\phi_2$ showing the thickness of the electrolytic capacitor-specific electrode member and length $L_2$ of the electrolytic capacitor-specific electrode is $\phi_2 > L_2$ as shown in FIG. 3, which may also be included in the electrolytic capacitor-specific electrode member in the present invention. It is preferable that the electrolytic capacitor-specific electrode member satisfies the relation of $\phi_2 < L_2$. In this case, the proportion of the surface area to the cross-sectional area is increased, so that the capacitance can be readily achieved. Furthermore, a leakage current can also be further reduced.

When base material 10 is etched to manufacture electrolytic capacitor-specific electrode member 20, and when a crater-shaped cavity portion is formed at least in the first layer from the outermost layer among a plurality of layers forming a porous layer as described later, dissolution of aluminum is facilitated by adding Ni to an aluminum material. Accordingly, a crater-shaped cavity portion can be readily formed. Thus, it is preferable that electrolytic capacitor-specific electrode member 20 also contains Ni. Also, electrolytic capacitor-specific electrode member 20 suitably contains 5 ppm to 150 ppm of Ni, and particularly suitably contains 20 ppm to 100 ppm.

(2) Specific Structure of Porous Layer

In a cross section of electrolytic capacitor-specific electrode member 20 that is perpendicular to the axial direction, porous layers 85 includes a plurality of layers that are arranged concentrically from the core portion 7 side toward outside and that at least include two layers having different void ratios.

The plurality of layers are formed of low void ratio layers 8 and high void ratio layers 9 that are alternately arranged. Specifically, from the surface layer side of electrolytic capacitor-specific electrode member 20, low void ratio layers 8 and high void ratio layers 9 are alternately arranged in this order in layers.

In this case, the high level and the low level of void ratios are determined in accordance with the relative evaluation of the adjacent layers. Accordingly, a plurality of low void ratio layers 8 may have different void ratios and a plurality of high void ratio layers 9 may have different void ratios.

When a void ratio per unit area in the n-th layer from the outermost layer among the plurality of layers is expressed by $f(n)$ (n is a positive integer), $f(2k-1)<f(2k)$ and $f(2k)>f(2k+1)$ or $f(2k-1)>f(2k)$ and $f(2k)<f(2k+1)$ are satisfied.

When $f(2k-1)<f(2k)$ is satisfied, the 2k-1-th layer is a low void ratio layer and the 2k-th layer is a high void ratio layer. In contrast, when $f(2k-1)>f(2k)$ is satisfied, the 2k-1-th layer is a high void ratio layer and the 2k-th layer is a low void ratio layer.

The plurality of layers may include even numbers of layers or may include odd numbers of layers.

The number of layers is different depending on the thickness of porous layer 85. The preferable number of layers and the more preferable number of layers are defined as follows in accordance with the structure of porous layer 85.

In this case, it is assumed that: the lower limit value and the upper limit value of the number of layers are defined as Nmin and Nmax, respectively; the thickness of porous layer 85 is defined as Z; the lower limit value and the upper limit value of the range of the thickness of low void ratio layer 8 are defined as Xmin and Xmax, respectively; and the lower limit value and the upper limit value of the thickness of high void ratio layer 9 are defined as Ymin and Ymax, respectively. Also, the value in the first decimal place is rounded off and Nmin is set to be 3 or more.

Then, the result calculated using the preferable ranges of the thickness of low void ratio layer 8 and the thicknesses of high void ratio layer 9 is defined as a preferable range of the number of layers. Also, the result calculated using the more preferable ranges of the thickness of low void ratio layer 8 and the thicknesses of high void ratio layer 9 is defined as a more preferable range of the number of layers. The preferable range and the more preferable range of each layer thickness will be described later.

When the outermost layer and the innermost layer each are low void ratio layer 8, $N_{max}=(Z-X_{min})/(X_{min}+Y_{min})$ and $N_{min}=(Z-X_{max})/(X_{max}+Y_{max})$.

When the outermost layer and the innermost layer each are high void ratio layer 9, $N_{max}=(Z-Y_{min})/(X_{min}+Y_{min})$ and $N_{min}=(Z-Y_{max})/(X_{max}+Y_{max})$.

When the outermost layer is high void ratio layer 9 while the innermost layer is low void ratio layer 8 or when the outermost layer is low void ratio layer 8 while the innermost layer is high void ratio layer 9, $N_{max}=Z/(X_{min}+Y_{min})$ and $N_{min}=Z/(X_{max}+Y_{max})$.

Porous layer 85 can be formed appropriately using methods such as etching (AC, chemical, and the like), vapor deposition and powder adhesion (including sintering after adhesion).

For example, when porous layer 85 is formed by etching, pits are not excessively formed in low void ratio layer 8, but the pit structure of the layer is designed to contribute to enlargement of the surface area of electrolytic capacitor-specific electrode member 20 in accordance with the working voltage when an electrolytic capacitor is fabricated. From such a point of view, the void ratio of low void ratio layer 8 is preferably 15% to 80% and more preferably 25% to 75%.

In the same manner as described above, when porous layer 85 is formed by etching, in high void ratio layer 9, the pit structure of the layer is designed not to contribute to enlargement of the surface area of electrolytic capacitor-specific electrode member 20 in accordance with the working voltage when an electrolytic capacitor is fabricated, but designed to particularly contribute to the impregnation performance of a solid electrolyte. However, the mechanical strength of porous layer 85 has to be maintained. From such a point of view, the void ratio of high void ratio layer 9 is preferably 65% to 95% and more preferably 80% to 90%. However, high void ratio layer 9 is to be higher in void ratio than low void ratio layer 8.

In addition to a problem of propagation of pits when porous layer 85 is formed by AC etching, for example, also when porous layer 85 is formed by vapor deposition, excessively dense adhesion of vapor deposition particles may deteriorate the impregnation performance in the portion of the surface area of electrolytic capacitor-specific electrode member 20 even though this surface area is enlarged. Accordingly, when a layer having vapor deposition particles sparsely adhering thereto is formed between adjacent layers each having vapor deposition particles densely adhering thereto, a network for impregnation with an electrolyte is formed also in electrolytic capacitor-specific electrode member 20 in its longitudinal direction. Consequently, electrolytic capacitor-specific electrode member 20 is improved in impregnation performance of an electrolyte and raised in capacitance appearance ratio.

In FIG. 6, the first layer from the outermost layer is low void ratio layer 8, but without being limited thereto, the first layer from the outermost layer may be a high void ratio layer, and subsequently, a low void ratio layer and a high void ratio layer may be alternately arranged.

Preferably, high void ratio layer 9 is less in thickness than low void ratio layer 8. This is due to the following reason.

Specifically, when high void ratio layer 9 is formed too thick, low void ratio layer 8 contributing to enlargement of the surface area of electrolytic capacitor-specific electrode member 20 cannot be formed accordingly, thereby reducing the capacitance of the electrolytic capacitor.

Preferably, the innermost layer among the plurality of layers forming porous layer 85 is low void ratio layer 8. In other words, when porous layer 85 is formed of x layers, $f(x-1)>f(x)$ is satisfied (where x is a positive integer equal to or greater than 2).

In consideration of the main object of providing high void ratio layer 9, this is for improving the performance of impregnation of the microscopic voids located deeper than this layer 9 with an electrolyte (particularly, a solid electrolyte).

Thus, when the innermost layer among the plurality of layers forming porous layer 85 is high void ratio layer 9, microscopic void portions do not exist at the position deeper than this innermost layer. Accordingly, when high void ratio layer 9 is located on the outer side by one layer from the innermost layer and when low void ratio layer 8 is the innermost layer, the impregnation performance of a solid electrolyte can be more effectively improved.

Furthermore, high void ratio layer 9 also contributes to enlargement of the surface area in electrolytic capacitor-specific electrode member 20. However, low void ratio layer 8 includes a larger number of microscopic voids than high void ratio layer 9, and therefore, more significantly contributes to enlargement of the surface area. Accordingly, it is more preferable that low void ratio layer 8 is provided on the innermost side also for the purpose of enlarging the surface area of base material 10.

It is preferable that each of the plurality of layers has a layer thickness that is approximately uniform in the circumferential direction. In this case, the term "approximately uniform" means that manufacturing variations are essentially permissible, and specifically, an error of approximately ±30% to the setting value is permissible.

Figure 7:
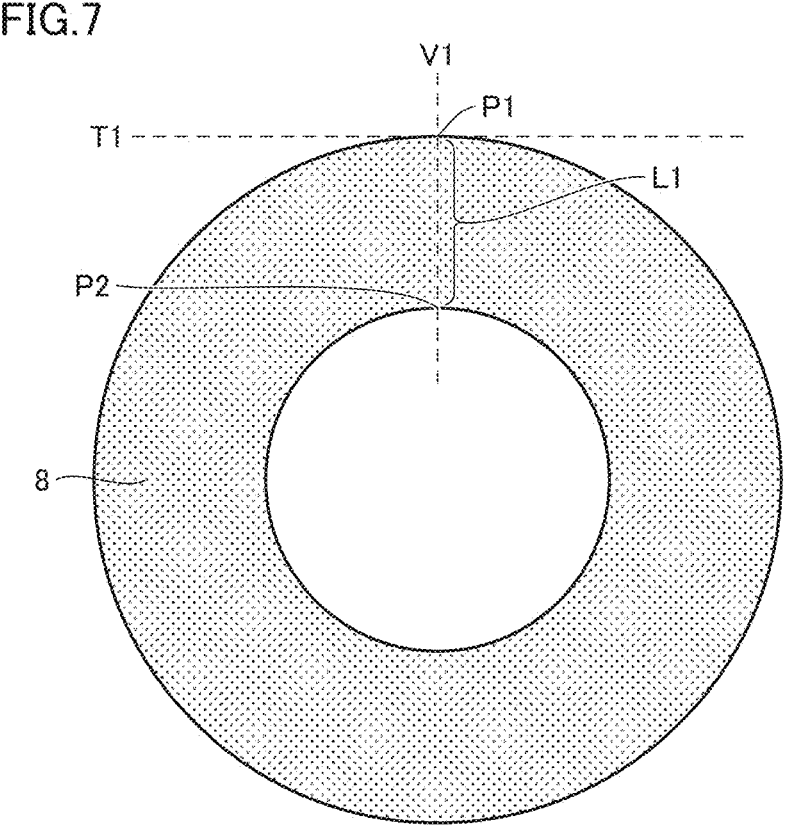
FIG. 7 is a schematic diagram showing one of a plurality of layers shown in FIG. 6.

FIG. 7 is a schematic diagram showing one of the plurality of layers shown in FIG. 6. Referring to FIG. 7, one of the plurality of layers will be hereinafter described.

As shown in FIG. 7, this one layer is located at the n-th position from the outermost layer among the plurality of layers forming porous layer 85. When a straight line V1 orthogonal to a substantially tangential line T1 at an optional point P1 on the outer circumferential edge is drawn in the layer located at the n-th position from the outermost layer, a distance L1 is approximately uniform in the circumference direction. In this case, distance L1 extends between point P1 and a point P2 of intersection between straight line V1 and the inner circumferential edge of the layer located at the n-th position from the outermost layer.

In this way, the layer thickness is approximately uniform in the circumferential direction in each of the plurality of layers forming porous layer 85. The plurality of layers may be different in thickness or may be identical in thickness.

The thickness of low void ratio layer 8 is preferably 3 μm to 50 μm and more preferably 3 μm to 25 μm. Furthermore, the thickness of high void ratio layer 9 is 0.4 μm to 5 μm and more preferably 0.4 μm to 3 μm.

As described above, when the plurality of layers are approximately uniform in thickness, void portions significantly contributing to enlargement of the surface area of electrolytic capacitor-specific electrode member 20 are uniformly formed in low void ratio layer 8 while void portions contributing to the impregnation performance of an electrolyte are uniformly formed in high void ratio layer 9.

Accordingly, the effect of enlarging the surface area and the effect of improving the impregnation performance of an electrolyte can be more effectively achieved. Consequently, the electrolytic capacitor that is increased in capacitance appearance ratio and further improved in capacitance can be manufactured.

On the other hand, even when the thickness of the innermost layer particularly formed last is not approximately uniform in the circumferential direction, the capacitance can be further increased by forming a larger number of microscopic void portions, for example.

(3) Surface Layer-Side Structure of Porous Layer

Preferably, a crater-shaped cavity portion 25 (see FIG. 10) is formed in the surface layer of electrolytic capacitor-specific electrode member 20. In this case, the "crater-shaped" represents the shape formed such that the depth from the opening plane to the bottom portion of the cavity portion is shorter than the largest opening diameter in the opening plane of cavity portion 25.

Crater-shaped cavity portion 25 exists at least in the first layer from the outermost layer among the plurality of layers forming porous layer 85. The crater-shaped cavity portion existing in the first layer from the outermost layer is opened to the outside. Furthermore, when a relatively deep crater-shaped cavity portion exists in the first layer from the outermost layer, the bottom portion of crater-shaped cavity portion 25 may reach the second and subsequent layers from the outermost layer.

The first layer from the outermost layer is configured as void ratio low layer 8 as described above and formed to have void portions relatively densely provided so as to contribute to enlargement of the surface area. Thus, in the stage of the first layer from the outermost layer, the void portion located deeper than this first layer may not be impregnated with an electrolyte. Even in such a case, due to a crater-shaped cavity portion larger than the void portion formed in the first layer from the outermost layer, the impregnation performance in the first layer from the outermost layer can be ensured by the amount corresponding to this depth. Thereby, a high capacitance appearance ratio can be achieved.

Preferably, the crater-shaped cavity portions each having an opening diameter represented by a circle equivalent diameter of 1 μm to 500 μm exist in a density of 1 piece/mm$^2$ to $2.0 \times 10^5$ pieces/mm$^2$. For example, when a solid electrolyte such as a conductive polymer is used for an electrolyte, crater-shaped cavity portions each having an opening diameter of 1 μm to 500 μm are formed in the surface layer of the base material in consideration of the particle size of each solid electrolyte, so that an electrolyte can be sufficiently supplied to the first layer from the outermost layer. This leads to improvement in the capacitance appearance ratio of the entire electrolytic capacitor-specific electrode member 20.

(4) Method of Forming Porous Layer

Examples of the method of forming a cavity portion in electrolytic capacitor-specific electrode member 20 in the present invention may be etching (AC, chemical, and the like), vapor deposition, and powder adhesion (including sintering performed after adhesion).

Examples of etching may be AC etching or chemical etching in an aqueous solution containing hydrochloric acid. In this case, AC etching is more preferably since it allows more uniform control of pits. In addition, alkali treatment or acid treatment can also be performed before AC etching for the purpose of degreasing the surface of the base material.

AC etching includes repeatedly-performed steps including: the step of generating microscopic pits contributing to enlargement of the surface area; and the step of generating a void portion that is larger than each of the microscopic pits contributing to enlargement of the surface area and that contributes to the impregnation performance. In the step of generating microscopic pits contributing to enlargement of the surface area, low void ratio layer 8 can be formed. In the step of generating a void portion that is larger than each of the microscopic pits contributing to enlargement of the surface area and that contributes to the impregnation performance, high void ratio layer 9 can be formed. The frequency is higher, for example, in the step of generating microscopic pits contributing to enlargement of the surface area than in the step of generating a void portion contributing to the impregnation performance. The amount of the solution circulated in an etching bath is less in the step of generating a void portion that is larger than each of the microscopic pits contributing to enlargement of the surface area and that contributes to the impregnation performance than in the step of generating microscopic pits contributing to enlargement of the surface area. Consequently, the conditions such as a liquid composition and a liquid temperature at the front end of etching are greatly different from those in the etching bath. This intentionally causes abnormal dissolution, thereby forming a relatively large void portion.

Furthermore, the method of manufacturing electrolytic capacitor-specific electrode member 20 in the present invention also includes adding the step of forming a protection film between AC etching and AC etching in order to protect microscopic pits contributing to enlargement of the area of the already formed surface.

In this case, in AC etching, the reaction in the anode half cycle and the reaction in the cathode half cycle alternately occur. Also in the cathode half cycle, the consumption of hydrogen ions in the anode half cycle leads to an increase in the hydroxide ion concentration in the pits, thereby forming a protection film for protecting the pits.

However, in AC etching, the same current waveform is generally used in the anode half cycle and the cathode half cycle. Thus, it cannot be said that a sufficient protection film is formed in the cathode half cycle.

Thus, when the dissolution amount reaches a certain level, the step of forming a protection film is separately performed, thereby further strengthening protection of the already existing pits. Furthermore, when thermal treatment is employed as the step of forming a protection film, a film is readily formed on the already existing pits on the outer circumferential surface, so that the effect of protecting the already existing pits on the outer circumferential surface can be obtained.

Furthermore, in the case of vapor deposition and powder adhesion (including sintering), for example, vapor deposition particles and powder (including particles that can be sintered) are densely arranged so that voids are decreased in the vicinity of the surface of core portion 7 (base material 10). Then, when the thicknesses of the vapor deposition layer and the powder adhesion layer (including a sintered layer) become closer to the preset thickness, the conditions are changed such that the vapor deposition particles and powder (including the particles that can be sintered) are sparsely arranged. When the thickness again becomes closer to the preset thickness, the conditions are again changed such that the vapor deposition particles and powder are densely arranged in this case. By repeating this process, electrolytic capacitor-specific electrode member 20 in the present invention can be manufactured.

For the purpose of simplifying the step of manufacturing an electrolytic capacitor, etching is more preferable than vapor deposition and powder adhesion (including sintering).

3. Electrolytic Capacitor

An electrolytic capacitor in the present invention includes: the electrolytic capacitor-specific electrode member; a counter electrode member disposed so as to face the electrolytic capacitor-specific electrode member; and an electrolyte disposed between the electrolytic capacitor-specific electrode member and the counter electrode member. Preferably, the electrolyte is a solid electrolyte containing a conductive polymer.

Figure 11:
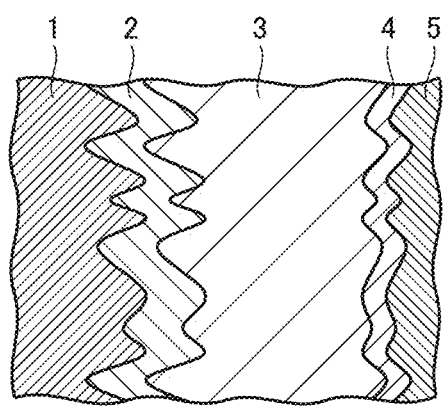
FIG. 11 is a diagram schematically showing a conventional electrolytic capacitor.
Figure 12:
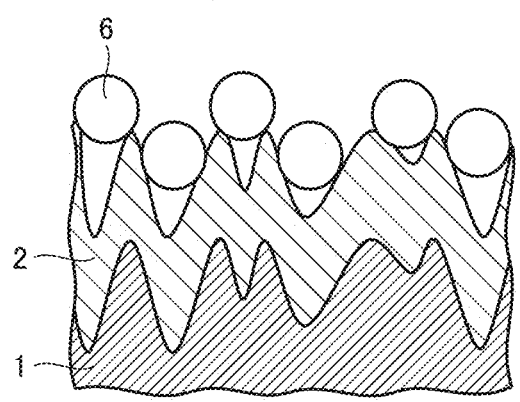
FIG. 12 is a diagram schematically showing the degree of impregnation with a solid electrolyte in a conventional electrolytic capacitor-specific electrode member.

Specifically, the electrolytic capacitor in the present invention is approximately identical in configuration to the electrolytic capacitor shown in FIG. 11, except that the electrolytic capacitor-specific electrode member according to the present embodiment is used as an anode body.

More specifically, the electrolytic capacitor in the present invention includes: an anode body; a dielectric formed on the anode body; an electrolyte disposed adjacent to the dielectric on the opposite side to the anode body; and a cathode body as a counter electrode member disposed so as to face anode body 1 with the electrolyte interposed between this cathode body and the anode body.

(1) Dielectric

When electrolytic capacitor-specific electrode member 20 in the present invention is used as an anode body, a dielectric film is formed on its surface, which may be formed, for example, by a method such as anodization in an aqueous solution of ammonium borate, ammonium phosphate, adipic acid ammonium, and the like.

(2) Electrolyte

There are two types of electrolytic capacitors including: an electrolytic capacitor containing a liquid-state electrolyte (an electrolytic solution for driving); and an electrolytic capacitor containing a solid-state electrolyte (a solid electrolyte). Electrolytic capacitor-specific electrode member 20 in the present invention can be used for each of these two types of electrolytic capacitors. Also, in the electrolytic capacitor in the present invention, an electrolytic solution for driving and a solid electrolyte that have been conventionally used for an electrolytic capacitor can be used.

Examples of the electrolytic solution for driving may contain polyethylene glycol, γ-butyrolactone and the like as a solvent: and examples of the conductive polymer in a solid electrolyte may contain polypyrrole, polythiophene, polyfuran, polyaniline, a derivative thereof or the like.

(3) Cathode Body

In the case where electrolytic capacitor-specific electrode member 20 in the present invention is used as an anode body, and when an electrolyte is an electrolytic solution for driving, the cathode body can be formed using a cathode foil having the same configuration as the cathode used for an electrolytic capacitor when an anode body is formed in a foil shape. On the other hand, when an electrolyte is a solid electrolyte, the cathode body can also be formed using a cathode foil as in the case where an electrolytic solution for driving is used, and a stacked body formed of a carbon layer and a silver paste layer can also be used, for example.

(4) Main Material of Other Electrolytic Capacitors

A separator inserted between an anode body and a cathode body, an anode terminal connected to an anode body, a cathode terminal connected to a cathode body, an aluminum case, and a sealing rubber can be those that have been conventionally used for an electrolytic capacitor.

(5) Method of Manufacturing Electrolytic Capacitor

The following is an explanation about one example of a manufacturing method used in the case where electrolytic capacitor-specific electrode member 20 in the present invention is used as an anode body and an electrolytic solution for driving is used as an electrolyte.

A dielectric is formed by anodization on the surface of the anode body. Then, an anode terminal is connected by laser welding or the like to the anode body having the dielectric formed thereon. A separator and a cathode foil having a cathode terminal connected thereto are sequentially wound around the anode body having a surface on which the dielectric is formed. The anode body and the cathode foil wound therearound are impregnated with an electrolytic solution for driving as an electrolyte. The anode body and the cathode foil that are impregnated with the electrolytic solution for driving are housed in an aluminum case. Then, the opening of the aluminum case is sealed by a sealing rubber.

The following is an explanation about another example of a manufacturing method used in the case where electrolytic capacitor-specific electrode member 20 in the present invention is used as an anode body and a solid electrolyte is used as an electrolyte.

A dielectric is formed by anodization on the surface of an anode body. Then, an anode terminal is connected by laser welding or the like to an anode body having a dielectric formed thereon. A separator and a cathode foil having a cathode terminal connected thereto are sequentially wound around the anode body having a surface on which the dielectric is formed.

Then, a conductive polymer layer as a solid electrolyte is formed between the anode body and the cathode foil wound therearound. The conductive polymer layer can be formed by: chemical oxidation polymerization for causing a polymerization reaction to occur by alternately applying (i) a monomer as a precursor of a polymer and (ii) a reaction solution made of a dopant and an oxidizing agent; electrolytic polymerization for causing a polymerization reaction to electrochemically occur in a reaction solution; a method of applying a solution in which conductive polymers exhibiting conductivity in advance are dissolved or dispersed in an arbitrary solvent; and the like. Furthermore, a conductive polymer can be formed also by combining the above-described methods.

As an example of combining the above-described methods, a layer is first formed by the method of using a dispersion solution, which is followed by chemical oxidation polymerization and electrolytic polymerization, in consideration of the chemical stress applied to electrolytic capacitor-specific electrode member 20. As a dispersion solution, poly(3,4-ethylenedioxythiophene) dispersion liquid and the like are commercially available, for example. Then, the anode body and the cathode foil having conductive polymers formed therebetween are housed in an aluminum case. Then, the opening of the aluminum case is sealed by a sealing rubber.

Also, an example of another manufacturing method will be hereinafter described. A dielectric is formed by anodization on the surface of an anode body. Then, in order to provide a cathode portion so as to cover the anode body on one end of the anode body, an insulating belt is formed in a portion between one end and the other end of the anode body. Thereby, the anode body is divided into: a cathode portion formation region where a cathode portion is formed on one end side; and an anode body exposure portion where the anode body is exposed on the other end side.

Examples of a method of forming an insulating belt may be: a method of forming an insulator inside the surface layer and the surface area enlargement layer of the base material; a method of forming an insulator by removing the surface area enlargement layer; and the like.

Then, a solid electrolyte layer is formed on the dielectric in the cathode portion formation region. Thereafter, a carbon layer and a silver paste layer are sequentially formed on the solid electrolyte layer. The carbon layer and the silver paste layer form a cathode portion.

Then, a cathode terminal is connected to the silver paste layer with an electrically conductive adhesive or the like. Also, the anode body exposure portion is connected to an anode terminal. Each of terminal materials may, for example, be a metal piece, a metal lead material, a printed wiring board pattern, and the like. Also, each of terminal materials can be connected by laser welding, resistance welding, ultrasonic welding, and the like. Each of terminal materials may also be made of a conductive resin, an electrically conductive adhesive, metal plating, and the like.

Then, molding is performed using a sealing material containing a resin. In the example of another manufacturing method, the electrolytic capacitor in the present invention may also include a parallel arrangement of anode bodies with a cathode body made of a carbon layer and a silver paste layer interposed therebetween, and a plurality of stacks of such parallel arrangements.

4. Evaluation Method (1) Structure of Porous Layer

Electrolytic capacitor-specific electrode member 20 having porous layer 85 formed therein is cut perpendicular to its longitudinal direction to obtain a cross section, which is then observed by a scanning electron microscope or a microscope.

Each of the plurality of layers forming porous layer 85 is cut perpendicular to its longitudinal direction to obtain a cross section, which is then observed at ten optional positions using a microscope (VHX-600 manufactured by KEYENCE CORPORATION) on the observation conditions including photographing conditions as standard and observation field-of-view of 0.19 μm in length×15 μm in breadth, thereby obtaining images. Each of the obtained images is subjected to binarization processing using image-analysis software ("Ei-Zo Kun" (registered trademark) manufactured by Asahi Kasei Engineering Corporation (AZO.EXE: Ver. 2.30, WIPETC32.DLL: Ver. 2.01, IPLIB32.DLL: Ver. 2.01)) to calculate the area ratio of a light-colored portion in each image. For each of the plurality of layers, the average area ratio of the obtained ten area ratios is calculated and defined as a void ratio in the relevant layer. For the layer having crater-shaped cavity portions formed therein, the void ratio in the area not including a crater-shaped cavity portion is calculated.

The thickness of each of the layers forming porous layer 85 is calculated. This thickness is calculated based on the "Method of Calculating Thickness of Each of Layers Forming Porous Layer 85" as described later.

Furthermore, when generation of a crater-shaped cavity portion is observed as a result of observing the outer circumferential surface of electrolytic capacitor-specific electrode member 20 using a scanning electron microscope, the obtained image is subjected to binarization processing using image-analysis software to calculate the circle equivalent diameter of each cavity portion in the observed field-of-view. The number of the crater-shaped cavity portions included in the range of 1 μm to 500 μm and the number of other cavity portions are calculated and converted into number per mm$^2$.

If the void ratios in the layers adjacent to each other among the layers forming porous layer 85 are merely relatively compared with each other, the above-described evaluation method can be replaced with observation of a secondary electron image using a scanning electron microscope. In the secondary electron image, the difference in color tone between the obtained images is not caused by a difference in composition in the observed sample but caused by reflection of projections and depressions. A darker color tone indicates more void portions. Accordingly, the high/low levels of the void ratios can be relatively compared by the difference in color tone.

"Method of Calculating Thickness of Each of Layers Forming Porous Layer 85"

The method of calculating the thickness of each layer will be hereinafter described with reference to FIG. 7 showing a schematic diagram of the entire electrolytic capacitor-specific electrode member 20 in the present invention in a view perpendicular to its longitudinal direction.

For calculating the thickness, ten optional points P1 on the outer circumferential edge of the n-th layer from the outermost layer are selected. An approximately tangential line T1 is drawn to each point P1 and a straight line V1 orthogonal to this approximately tangential line T1 is then drawn, to calculate a point P2 of intersection between straight line V1 and the inner circumferential edge of the n-th layer from the outermost layer. Then, a distance L1 is calculated, which extends between point P2 and an optional point P1 on the outer circumference of the n-th layer selected at that time from the outermost layer. Further, an average value of distances L1 at ten optional points P1 is calculated. Also in each of the layers, the above-mentioned average value is similarly calculated.

(2) Capacitance and Capacitance Appearance Ratio

By an LCR meter with a measuring frequency of 120 Hz, the capacitance of electrolytic capacitor-specific electrode member 20 before immersion in a conductive polymer solution is measured in an adipic acid ammonium aqueous solution or an ammonium borate aqueous solution in accordance with the aqueous solution used during anodization. Then, the capacitance of the manufactured capacitor is measured by the LCR meter with a measuring frequency of 120 Hz. The capacitance appearance ratio is calculated from the capacitance of the capacitor and the capacitance of electrolytic capacitor-specific electrode member 20 in the aqueous solution.

(3) Leakage Current

The current value after one-minute application of a rated voltage to a solid electrolytic capacitor is measured. The leakage current is calculated from the following equation 1.

Leakage current=current value (μA) after one-minute application of rated voltage/capacitance (μF) of capacitor measured at 120 Hz·rated voltage (V))     (Equation 1)

EXAMPLES

In the following, the present invention will be described in detail with reference to Examples and Comparative Examples of the present invention, but the present invention is not limited to Examples thereby.

Example 1

(1) For a base material in the state before formation of a cavity portion, the following conditions were employed.

(I) Shape: a cylindrical shape having a circular cross-sectional shape that is perpendicular to the longitudinal direction.

(II) Component: an aluminum material with a purity of 99.99%.

(III) Diameter: 0.3 mm.

(IV) Length: 1.5 mm.

(2) After performing acid treatment for the purpose of degreasing the base material surface, in an aqueous solution containing 4.5 wt % of hydrochloric acid, 0.9 wt % of sulfuric acid, and 2.0 wt % of aluminum chloride (which will be hereinafter referred to as an etching solution), the etching solution was supplied to base material 10 in the axial direction of base material 10 to circulate the etching solution. In such a state, AC etching was performed in eleven steps on the conditions of: a solution temperature of 45° C.; a current density of 280 mA/cm², a frequency of 12 Hz; and a current waveform (half wave) of a triangular wave, such that porous layer 85 was formed to have a thickness of about 50 µm. The flow rate at which the etching solution was supplied (that is, the amount of etching solution to be circulated) was set at 5 cm/min in the even number of times of AC etching and set at 40 cm/min in the odd number of times of AC etching among the plurality of times of AC etching. Furthermore, the etching time period was set such that the layer was thicker in the odd number of times of AC etching than in the even number of times of AC etching. Also, between the steps, water washing and one-minute thermal treatment at 500° C. were sequentially performed in order to form a film serving to protect the already existing pits. In addition, each time etching was performed, the solution temperature was lowered by 2.5° C. and the aluminum chloride concentration was diluted by 0.1 wt %. When AC etching ended, acid treatment was then performed for the purpose of removing chlorine ions. Thereby, electrolytic capacitor-specific electrode member 20 (an anode body) was prepared.

(3) In an adipic acid ammonium aqueous solution, a voltage of 3V was applied to electrolytic capacitor-specific electrode member 20 to anodize electrolytic capacitor-specific electrode member 20.

(4) A separator and a cathode foil for electrolytic capacitor were sequentially wound around electrolytic capacitor-specific electrode member 20 having a dielectric (an oxide film) formed thereon by anodization.

(5) Electrolytic capacitor-specific electrode member 20 and cathode foil wound therearound were immersed in commercially available PEDOT/PSS 1.0 wt % in H$_2$O (high-conductivity grade Orgacon (registered trademark) HIL-1005 (product number: 768642)) manufactured by SIGMA-ALDRICH, and thereafter, dried. This process was repeatedly performed a prescribed number of times to form a solid electrolyte between electrolytic capacitor-specific electrode member 20 and the cathode foil.

(6) Electrolytic capacitor-specific electrode member 20 and the cathode foil having the solid electrolyte layer formed therebetween were housed in an aluminum case. Then, the opening of the aluminum case was sealed by a sealing rubber.

Example 2

Except that: the flow rate at which the etching solution was supplied was set at 5 cm/min in the odd number of times of AC etching and set at 40 cm/min in the even number of times of AC etching among the plurality of times of AC etching; and that the layer was formed thicker in the even number of times of AC etching than in the odd number of AC etching, electrolytic capacitor-specific electrode member 20 and an electrolytic capacitor were manufactured in the same manner as in Example 1.

Example 3

Except that AC etching was divided into twelve steps and the quantity of electricity for each AC etching was less than that in Example 1 in order to set the dissolution weight loss to be equal, electrolytic capacitor-specific electrode member 20 and an electrolytic capacitor were manufactured in the same manner as in Example 1.

Example 4

Except that thermal treatment was not performed between the steps of each AC etching, electrolytic capacitor-specific electrode member 20 and an electrolytic capacitor were manufactured in the same manner as in Example 1.

Example 5

Except that a prism-shaped member having a square cross-sectional shape perpendicular to the longitudinal direction and having four sides each having a length of 0.24 mm was used as a base material, electrolytic capacitor-specific electrode member 20 and an electrolytic capacitor were manufactured in the same manner as in Example 1.

Example 6

Except that the component of the base material was an aluminum material with a purity of 99.99% and containing 50 ppm of Ni, electrolytic capacitor-specific electrode member 20 and an electrolytic capacitor were manufactured in the same manner as in Example 1.

Comparative Example 1

Except that AC etching was not divided but performed in one step on fixed conditions, electrolytic capacitor-specific electrode member 20 and an electrolytic capacitor were manufactured in the same manner as in Example 1. The flow rate at which an etching solution was supplied was fixed at 40 cm/min.

Example 7

Except that the frequency in AC etching was set at 8 Hz and the voltage to be applied during anodization was set at 50V, electrolytic capacitor-specific electrode member 20 and an electrolytic capacitor were manufactured in the same manner as in Example 1.

Comparative Example 2

Except that AC etching was not divided but performed in one step on fixed conditions, electrolytic capacitor-specific electrode member 20 and an electrolytic capacitor were manufactured in the same manner as in Example 7. The flow rate at which an etching solution was supplied was fixed at 40 cm/min.

With regard to Examples 1 to 7 and Comparative Examples 1 and 2, Table 1 shows the summary of the structure of porous layer 85; Table 2 shows the average values of the void ratios and the thicknesses about the layers forming porous layer 85 (regarding only Examples); and Table 3 shows the capacitance, the capacitance appearance ratio and the leakage current in an aqueous solution for electrolytic capacitor-specific electrode member 20 after anodization and before immersion in a conductive polymer solution.

Furthermore, Table 3 shows the value of capacitance in each of Examples 1 to 6 based on the value defined as 100 in Comparative Example 1, and shows the value of capacitance in Example 7 based on the value defined as 100 in Comparative Example 2. The capacitance appearance ratio is expressed as "%". The leakage current is expressed as "µA/(µF·V)".

TABLE 1

| | Base Material Cross Section | Porous Layer 85 | | | Crater |
|---|---|---|---|---|---|
| | | Number of Layers | Void Ratio of Each Layer (High/Low Level Sequentially from Outermost Layer) | Thickness of Each Layer | |
| Example 1 | Circle | 11 | Low → High → (Alternately Low/High) → Low | Approximately Uniform | None |
| Example 2 | Circle | 11 | High → Low → (Alternately High/Low) → High | Approximately Uniform | None |
| Example 3 | Circle | 12 | Low → High → (Alternately Low/High) → High | Approximately Uniform | None |
| Example 4 | Circle | 11 | Low → High → (Alternately Low/High) → Low | Not Approximately Uniform | None |
| Example 5 | Square | 11 | Low → High → (Alternately Low/High) → Low | Approximately Uniform | None |
| Example 6 | Circle | 11 | Low → High → (Alternately Low/High) → Low | Approximately Uniform | Exist |
| Comparative Example 1 | Circle | 1 | — | — | None |
| Example 7 | Circle | 11 | Low → High → (Alternately Low/High) → Low | Approximately Uniform | Exist |
| Comparative Example 2 | Circle | 1 | — | — | None |

TABLE 2

| n-th Layer from Outermost Layer | | Porous Layer 85 | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| Example 1 | Void Ratio (%) | 65 | 87 | 60 | 87 | 55 | 87 | 50 | 87 | 45 | 87 | 35 | — |
| | Thickness (μm) | 9.5 | 1.5 | 8.5 | 1.5 | 7.5 | 1.5 | 6.5 | 1.5 | 5.5 | 1.5 | 4.5 | — |
| Example 2 | Void Ratio (%) | 87 | 65 | 87 | 65 | 87 | 55 | 87 | 50 | 87 | 45 | 87 | — |
| | Thickness (μm) | 1.5 | 9.5 | 1.5 | 8.5 | 1.5 | 7.5 | 1.5 | 6.5 | 1.5 | 5.5 | 1.5 | — |
| Example 3 | Void Ratio (%) | 65 | 87 | 60 | 87 | 55 | 87 | 50 | 87 | 45 | 87 | 35 | 87 |
| | Thickness (μm) | 9.4 | 1.49 | 8.4 | 1.49 | 7.4 | 1.49 | 6.4 | 1.49 | 5.5 | 1.49 | 4.5 | 1.49 |
| Example 4 | Void Ratio (%) | 69 | 88 | 63 | 91 | 57 | 92 | 51 | 94 | 46 | 95 | 35 | — |
| | Thickness (μm) | 9.5 | 1.47 | 8.3 | 1.44 | 7.2 | 1.41 | 6.1 | 1.38 | 5.1 | 1.35 | 4.1 | — |
| Example 5 | Void Ratio (%) | 65 | 87 | 60 | 87 | 55 | 87 | 50 | 87 | 45 | 87 | 35 | — |
| | Thickness (μm) | 9.5 | 1.5 | 8.5 | 1.5 | 7.5 | 1.5 | 6.5 | 1.5 | 5.5 | 1.5 | 4.5 | — |
| Example 6 | Void Ratio (%) | 65 | 87 | 60 | 87 | 55 | 87 | 50 | 87 | 45 | 87 | 35 | — |
| | Thickness (μm) | 9.5 | 1.5 | 8.5 | 1.5 | 7.5 | 1.5 | 6.5 | 1.5 | 5.5 | 1.5 | 4.5 | — |
| Example 7 | Void Ratio (%) | 62 | 83 | 57 | 83 | 52 | 83 | 48 | 83 | 43 | 83 | 38 | — |
| | Thickness (μm) | 10.0 | 1.6 | 8.9 | 1.6 | 7.9 | 1.6 | 6.8 | 1.6 | 5.8 | 1.6 | 4.7 | — |

TABLE 3

| | Capacitance of Electrode Member | Capacitance Appearance Ratio (%) | Leakage Current (μA/(μF · V)) |
|---|---|---|---|
| Example 1 | 124 | 82.9 | $0.5 \times 10^{-2}$ |
| Example 2 | 110 | 80.5 | $0.7 \times 10^{-2}$ |
| Example 3 | 116 | 84.1 | $0.5 \times 10^{-2}$ |
| Example 4 | 108 | 78.9 | $0.9 \times 10^{-2}$ |
| Example 5 | 120 | 79.1 | $1.0 \times 10^{-2}$ |
| Example 6 | 128 | 83.7 | $1.0 \times 10^{-2}$ |
| Comparative Example 1 | 100 | 61.2 | $1.2 \times 10^{-2}$ |
| Example 7 | 120 | 98.7 | $0.2 \times 10^{-2}$ |
| Comparative Example 2 | 100 | 78.7 | $1.1 \times 10^{-2}$ |

Figure 8:
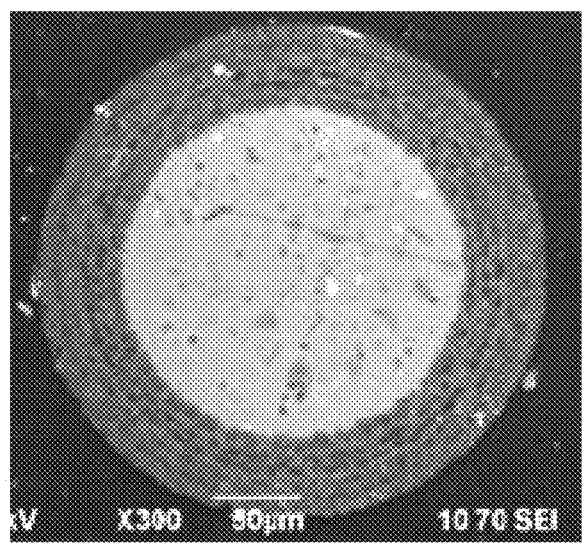
FIG. 8 is a scanning electron microscope photograph of the cross-sectional shape of the entire electrolytic capacitor-specific electrode member according to Example 1 that is cut perpendicular to its longitudinal direction (the axial direction).

A scanning electron microscope was used to observe the cross section of the entire electrolytic capacitor-specific electrode member 20 in a view of electrolytic capacitor-specific electrode member 20 before anodization in Example 1 as seen perpendicular to its longitudinal direction. Then, a photograph as shown in FIG. 8 was obtained. As shown in FIG. 8, in Example 1, a light-colored layer and a deep-colored layer were alternately arranged from the outermost layer of electrolytic capacitor-specific electrode member 20. In this case, the innermost layer was a light-colored layer.

Figure 9:
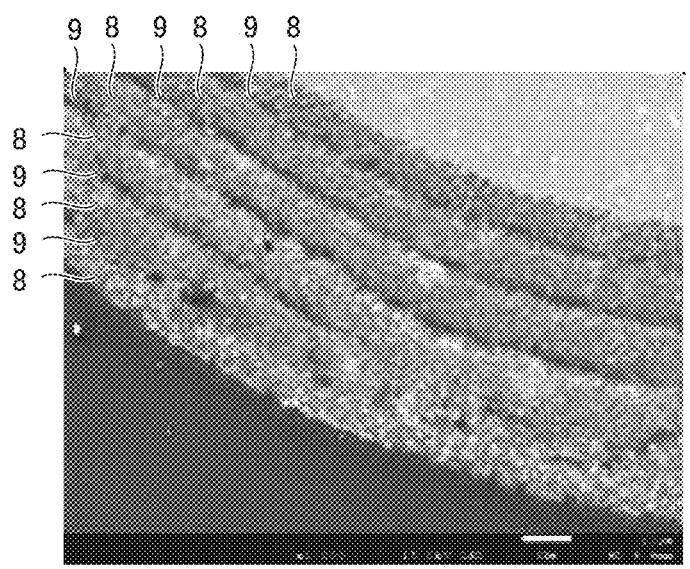
FIG. 9 is a scanning electron microscope photograph of the enlarged cross-sectional shape of a surface area enlargement layer obtained when an electrolytic capacitor-specific electrode member according to Example 6 is cut perpendicular to its longitudinal direction (the axial direction).

A scanning electron microscope was used to observe the cross section of the surface area enlargement layer in a view of electrolytic capacitor-specific electrode member 20 before anodization in Example 6 as seen perpendicular to its longitudinal direction. Then, a photograph as shown in FIG. 9 was obtained. The magnification was raised in FIG. 9. As shown in FIG. 9, also in Example 6, a light-colored layer and a deep-colored layer were alternately arranged from the outermost layer of electrolytic capacitor-specific electrode member 20. In this case, the innermost layer was a light-colored layer.

In Examples 1 and 6, irrespective of the component of the base material (whether Ni was contained or not), a light-colored layer and a deep-colored layer were alternately arranged from the outermost layer of electrolytic capacitor-specific electrode member 20. In this case, the innermost layer was a light-colored layer. In other words, low void ratio layer 8 and high void ratio layer 9 were alternately arranged from the outermost layer of electrolytic capacitor-specific electrode member 20. In this case, the innermost layer was low void ratio layer 8.

The deep-colored layer was less in thickness than the light-colored layer. In other words, high void ratio layer 9 was less in thickness than low void ratio layer 8.

Furthermore, the base material was formed to have a circular cross-sectional shape perpendicular to its longitudinal direction. In this case, each of the plurality of layers forming porous layer 85 was approximately uniform in thickness in the circumferential direction. The plurality of layers forming porous layer 85 were arranged approximately q so as to be formed in an annular ring shape.

Figure 10:
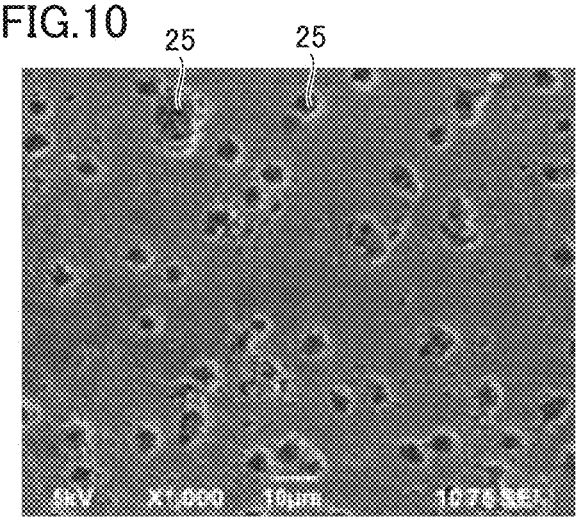
FIG. 10 is a scanning electron microscope photograph of the surface layer of the electrolytic capacitor-specific electrode member according to Example 6 that is taken perpendicular to the axial direction.

In Example 6, as a result of observing the outer circumferential surface of electrolytic capacitor-specific electrode member 20 from the direction perpendicular to the axial direction, a photograph as shown in FIG. 10 was obtained. The surface layer of electrolytic capacitor-specific electrode member 20 was provided with microscopic cavity portions and crater-shaped cavity portions 25 that were larger than the microscopic cavity portions and were on the order of about 5 μm to about 10 μm.

When comparing Examples 1 to 6 with Comparative Example 1 and comparing Example 7 with Comparative Example 2, the value of leakage current was lower in Examples than in Comparative Examples while the capacitance appearance ratio was higher in Examples than in Comparative Examples in any case.

These comparisons show the following result. Specifically, irrespective of the working voltage in the electrolytic capacitor, when porous layer 85 is formed of a plurality of layers while low void ratio layer 8 and high void ratio layer 9 are alternately arranged, a high capacitance appearance ratio can be achieved while suppressing the leakage current.

When comparing Example 1 with Example 2, the value of the leakage current was smaller in Example 1 than in Example 2 while the capacitance was higher in Example 1 than in Example 2. This comparison shows that porous layer 85 formed of a plurality of layers is formed such that low void ratio layer 8 is arranged as the first layer from the outermost layer, and thereafter, high void ratio layer 9 and low void ratio layer 8 are alternately arranged as the second and subsequent layers, thereby achieving the effect of increasing the capacitance.

When comparing Example 1 with Example 3, the leakage current and the capacitance appearance ratio were approximately equal in Examples 1 and 3, but the capacitance was higher in Example 1 than in Example 3. This comparison shows that low void ratio layer 8 is arranged as the innermost layer that is formed last, thereby achieving the effect that a high capacitance appearance ratio can be maintained even when the surface area of electrolytic capacitor-specific electrode member 20 is increased.

In Examples 1 and 4, as a result of calculating the variations in thickness of each layer, the variations fall within ±20% of the values shown in Table 2 in Example 1 while the variations fall within ±50% in Example 4. In this case, the capacitance and the capacitance appearance ratio were higher in Example 1 than in Example 4. The leakage current was lower in Example 1 than in Example 4. This comparison shows the following result. Specifically, each of the layers forming porous layer 85 is formed to have an approximately uniform thickness (an error of about ±30% relative to the setting value). Thereby, it becomes possible to efficiently form pits contributing to enlargement of the surface area of electrolytic capacitor-specific electrode member 20 and pits contributing to improvement in impregnation performance. As a result, the effects of increasing the capacitance and the capacitance appearance ratio can be achieved.

The area of the outer circumferential surface of the base material was approximately the same in Example 1 and Example 5, but the capacitance appearance ratio was higher in Example 1 than in Example 5. In each of Examples 1 and 5, in a macroscopic view, the cross-sectional shape of electrolytic capacitor-specific electrode member 20 taken along the direction perpendicular to its longitudinal direction is identical to the cross-sectional shape of the base material taken along the direction perpendicular to its longitudinal direction. The cross-sectional shape of the base material in Example 1 is a circular shape. The cross-sectional shape of the base material in Example 5 is a square shape. Thus, in a macroscopic view, the cross-sectional shape of electrolytic capacitor-specific electrode member 20 is a circular shape in Example 1, and the cross-sectional shape of electrolytic capacitor-specific electrode member 20 is a square shape in Example 5. This comparison shows that the capacitance appearance ratio is higher in a circular shape than in an angular shape like a square shape. In other words, in a macroscopic view, it was confirmed that a higher capacitance appearance ratio is obtained when the cross-sectional shape of electrolytic capacitor-specific electrode member 20 in the axial direction has an annular shape not having an angular portion.

When comparing Example 1 with Example 6, the leakage current was approximately the same but the capacitance appearance ratio was higher in Example 6 than in Example 1. This comparison shows that porous layer 85 is formed of a plurality of layers, low void ratio layers and high void ratio layers are alternately arranged, and additionally, a crater-shaped cavity portion 25 is also formed in the surface layer of electrolytic capacitor-specific electrode member 20, thereby achieving the effect of further increasing the capacitance appearance ratio.

Although the embodiments and the examples of the present invention have been described as above, the embodiments and the examples disclosed herein are illustrative and non-restrictive in every respect. The scope of the present invention is defined by the terms of the claims, and is intended to include any modifications within the meaning and scope equivalent to the terms of the claims.

INDUSTRIAL APPLICABILITY

The present invention can be utilized for manufacturing an electrolytic capacitor for which a high capacitance appearance ratio is required, and particularly, a solid electrolytic capacitor. In addition, the electrolytic capacitor manufactured in the present invention is not particularly limited in application and the like, but can be used for a filter for attenuating a noise, for example.

REFERENCE SIGNS LIST

1 anode body, 2 dielectric, 3 electrolyte, 4 dielectric (natural oxide film), 5 cathode body, 6 solid electrolyte, 7 base material, 8 low void ratio layer, 9 high void ratio layer, 10 base material, 11 protrusion, 11*a* curved portion, 12 recess, 12*a* curved portion, 20 electrolytic capacitor-specific electrode member, 25 cavity portion, 85 porous layer.

The invention claimed is:
1. An electrolytic capacitor-specific electrode member included in an electrolytic capacitor, the electrolytic capacitor-specific electrode member having a wire shape, the electrolytic capacitor-specific electrode member comprising:

a core portion; and a porous layer that is located around the core portion, in a cross section of the electrolytic capacitor-specific electrode member perpendicular to an axial direction of the electrolytic capacitor-specific electrode member, the porous layer including a plurality of layers that are concentrically arranged from the core portion toward outside and that include at least two layers having different void ratios, wherein:

the core portion and the porous layer are formed from a same base material, and the porous layer including the at least two layers having different void ratios is formed from a roughened surface of the same base material.

2. The electrolytic capacitor-specific electrode member according to claim 1, wherein when a void ratio per unit area in an n-th layer from an outermost layer among the plurality of layers is expressed by $f(n)$ (n being a positive integer), $f(2k-1) < f(2k)$ and $f(2k) > f(2k+1)$ or $f(2k-1) > f(2k)$ and $f(2k) < f(2k+1)$ are satisfied (k being a positive integer).

3. The electrolytic capacitor-specific electrode member according to claim 1, wherein each of the plurality of layers has a thickness that is approximately uniform in a circumferential direction.

4. The electrolytic capacitor-specific electrode member according to claim 1, wherein in a macroscopic view of a cross-sectional shape of the electrolytic capacitor-specific electrode member perpendicular to the axial direction, the cross-sectional shape has a peripheral edge formed in an annular shape not having an angular portion.

5. An electrolytic capacitor comprising:

the electrolytic capacitor-specific electrode member according to claim 1;

a counter electrode member disposed to face the electrolytic capacitor-specific electrode member; and an electrolyte disposed between the electrolytic capacitor-specific electrode member and the counter electrode member.

6. The electrolytic capacitor according to claim 5, wherein the electrolyte is a solid electrolyte containing a conductive polymer.

* * * * *